United States Patent [19]

Détriché

[11] Patent Number: 4,617,504
[45] Date of Patent: Oct. 14, 1986

[54] POSITIONING DEVICE

[75] Inventor: Jean-Marie Détriché, Montesson, France

[73] Assignee: Commissariat a l'Energie Atomique, Paris, France

[21] Appl. No.: 663,403

[22] Filed: Oct. 22, 1984

[30] Foreign Application Priority Data

Oct. 20, 1983 [FR] France .................... 83 16701

[51] Int. Cl.$^4$ .............. G05B 19/33; B23K 19/12
[52] U.S. Cl. ................. 318/576; 318/569; 318/568; 219/124.22; 219/125.11
[58] Field of Search ............ 318/576, 577, 568, 569, 318/570, 632; 901/9, 42, 46, 47; 364/167, 168, 176; 219/124.22, 124.34, 125.1, 125.11

[56] References Cited

U.S. PATENT DOCUMENTS

| 4,215,299 | 7/1980 | Edwin | 901/46 X |
|---|---|---|---|
| 4,234,777 | 11/1980 | Balfanz | 901/42 X |
| 4,255,643 | 3/1981 | Balfanz | 901/42 X |
| 4,380,696 | 4/1983 | Masaki | 901/9 |
| 4,501,950 | 2/1985 | Richardson | 219/124.34 |

FOREIGN PATENT DOCUMENTS

| 0064454 | 9/1973 | European Pat. Off. . |
| 0034967 | 9/1981 | European Pat. Off. . |
| 2922825 | 12/1980 | Fed. Rep. of Germany . |
| 2088095 | 6/1982 | United Kingdom . |

OTHER PUBLICATIONS

E. A. Cladkov et al., "A Device for Guiding the Electrode Around a Curvilinear Butt Joint During Arc Welding", Sep., 1973, Automatic Welding, vol. 26, pp. 60–62.

Primary Examiner—William M. Shoop, Jr.
Assistant Examiner—Patrick C. Keane
Attorney, Agent, or Firm—Oblon, Fisher, Spivak, McClelland & Maier

[57] ABSTRACT

The invention relates to an adaptive control tool holder for fixing to the end of the carrier of a robot, controlling the displacement of said end in accordance with a stored path.

The tool holder defines a degree of freedom about an axis and a degree of translational freedom in a direction orthogonal to said axis. For a central translation reference position, the axis passes through the active center of the tool. A detection system rigidly fixed to the tool has preferably two detectors used for controlling the motors which control the two degrees of freedom, by means of independent feedback or control circuits. During the learning of the path prior to performing the task, the translation and the rotation are blocked in the reference position.

6 Claims, 3 Drawing Figures

POSITIONING DEVICE

BACKGROUND OF THE INVENTION

The present invention relates to a positioning device incorporating a tool holder for fixing to the end of a robot controlling the displacement of a tool in accordance with a stored path or trajectory.

Whatever task robots have to fulfil, most of them generally serve to make a tool follow a known, stored path, e.g. during a prior learning operation. To this main function is sometimes added the need to carry out a correction of the path followed by the tool during its displacement along the path, in order to take account of certain deformations of the parts, usually resulting from the action of the tool on said parts, or to take account of an incorrect positioning of the parts. Such a correction is performed by a so-called adaptive control process. The deformations can in particular result from the heating of the parts e.g. when the robot used is for welding two parts, or from a mechanical deformation thereof, when it e.g. relates to a cutting or deburring robot.

In practice, the robot is responsible for following the stored path, whereas the path corrections are generally brought about by acting on a tool holder having a certain number of degrees of freedom and which is fixed to the end of the robot. The present invention is independent of the type of robot used and essentially relates to the device used for performing the path corrections.

According to the state of the art, there are a certain number of devices able to fulfil this function. In order to illustrate existing devices, reference is made to French Patent Application No. 80 03152, filed on Feb. 13, 1980 by the Commissariat a l'Energie Atomique. This document particularly shows that such a device must be able to simultaneously support the tool and a detection system generally positioned upstream thereof with respect to the path to be followed. No matter what the detection principle used (mechanical sensor, eddy current matrix-type or unitary transducer, laser scanning optical transducer, etc.), the detection system has to indicate the displacement of the tool relative to the surface discontinuity or break or a profile to be followed and optionally the heightwise displacement of the tool relative to a surface, in order to make the tool correct its path.

A positioning device of this type having a simpler construction is described in the article "A device for guiding the electrode around a curvilinear butt joint during arc welding" by E. A. GLADKOV et ak, pp. 60–62 of the journal Automatic Welding, vol. 26, no. 9, September 1973 (Cambridge, G. B.).

In order to take account of the construction-based displacement existing between the detection system and the tool, in positioning devices of this type the detection system has a certain number of degrees of freedom, independently of the tool. Thus, the signals supplied by the detection system make it possible, by means of an appropriate feedback or control circuit, to position said system above the true path to be followed. A more or less complex and approximate calculation then makes it possible to reset the tool on said path, on the basis of signals emitted by the detection system.

The existing positioning devices of this type consequently suffer from the disadvantage of having a large, complex, heavy and therefore expensive mechanical structure (independent degrees of freedom for the detection system and for the tool) associated with an also complex and costly control electronics (calculation taking account of a time lag linked with the displacement between the tool and the detection system).

SUMMARY OF THE INVENTION

The object of the present invention is to provide a positioning device not suffering from the disadvantages of the known devices and remarkable through a considerable simplicity in its mechanical and electronic design, as well as its lightweight and reduced overall dimensions.

The present invention therefore specifically relates to a device for positioning a tool incorporating a tool holder for fixing to the end of a carrier able to move said tool in accordance with a stored path and carry out, on the basis of the detection of a true path to be followed by the tool, tool path corrections with respect to the stored path, said tool holder supporting a position detector displaced in the direction of the joint relative to the active centre of the tool via means for displacing the detector in a direction permitting a setting thereof on the real path, a first feedback or control circuit being associated with the position detector and controlling the said means, wherein the device also comprises an orientation detector, whose end is aligned with that of the position detector and with the active centre of the tool, the detectors being rigidly fixed to the tool in order to form a working head therewith, said first means being translation means for displacing the working head in a direction orthogonal to the plane passing through the ends of the detector and through the active centre of the tool, rotation means being provided for rotating the working head and the translation means about an axis contained in the plane and passing through the active centre of the tool, a second feedback or control circuit being associated with the orientation detector and controls said rotation means.

According to the invention, the expression "active centre of the tool" designates the geometrical centre of that portion of the tool which acts on the part. Thus, when the tool is a welding torch, the active centre is constituted by the end of the electrode, whereas when it is a grinding wheel, the active centre is the centre of the contact surface thereof with the part.

Although the main function of the device according to the invention is to make the tool transversely correct its path, particularly in order to follow a surface break or a profile, it can also be used for controlling the distance of the tool from the surface of the part. In this case, the device according to the invention also comprises a second translation means, for displacing the working head parallel to said axis.

According to a preferred embodiment of the invention, the orientation detector is positioned upstream of the position detector on considering the displacement direction of the working head along the true path.

BRIEF DESCRIPTION OF THE DRAWINGS

The invention is described in greater detail hereinafter relative to a non-limitative embodiment and the attached drawing, wherein show.

DETAILED DESCRIPTION OF THE INVENTION

Figure 1:
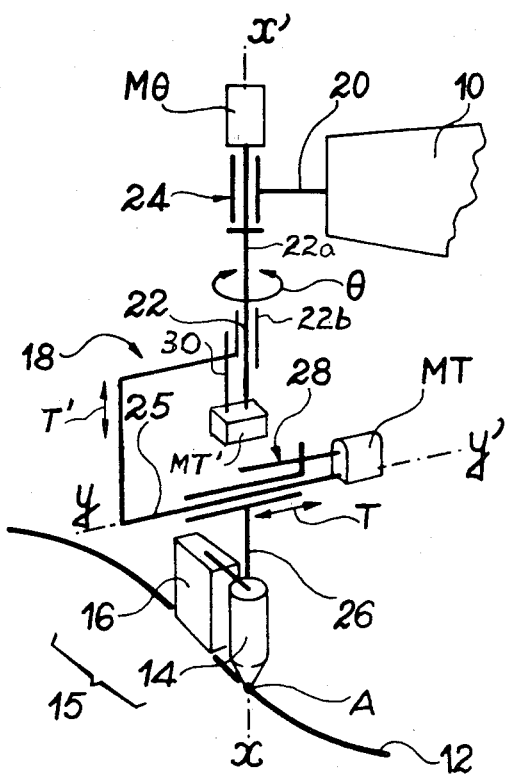
FIG. 1 is a perspective view diagrammatically showing the tool holder for an adaptive control process for the tool in accordance with the invention.

FIG. 1 shows the end 10 of a robot for controlling the following of a line 12 by a tool 14. Line 12 can in particular be constituted by a surface discontinuity or break, such as a joint formed between two metal sheets, a profile to be followed, etc.

It is pointed out that robot 10 does not form part of the present invention and can in fact be any known robot, such as an articulated arm or a system in which the different degrees of freedom are not linked with one another.

FIG. 1 shows tool 14 in the form of a welding torch, but it is obvious that the invention is not limited to this type of tool, and can also be used e.g. in a gluing, bonding, cutting or deburring robot.

In order to be able to detect at all times any variation between the line 12 which the tool must follow to perform its task and the stored path followed by the end 10 of the robot and consequently by the tool, if there is no correction in its path, a detection system 16 is provided. According to the invention, the detection system 16 is rigidly fixed to tool 14 and is positioned upstream thereof with respect to the displacement direction of the tool along its path.

According to the invention, it is pointed out that the detection system 16 can be constituted by any known detection system able to supply a signal representing a positioning, orietation and possibly height variation with respect to the line to be followed. Thus, it is possible to use any known detection system, such as mechanical sensors, eddy current matrix-type or unitary transducers, or laser scanning optical transducers.

According to the invention and as is more particularly illustrated by FIG. 1, the assembly or working head 15 constituted by tool 14 and detection system 16 is mounted at the end of robot 10 via a tool holder 18, which gives the said assembly two degrees of freedom. It will be subsequently shown with reference to FIG. 2 that the signals supplied by the detection system 16 are used for making working head 15 follow line 12 by acting on the two degrees of freedom defined by tool holder 18.

Tool holder 18 firstly comprises a plate 20 fixed to the end of robot 10 and supporting at its end a vertical shaft 22, via an articulation joint 24 enabling shaft 22 to rotate by an angle $\theta$ about its own axis xx'. Thus, joint 24 defines a first degree of rotational freedom $\theta$ about axis xx' for working head 15.

It should be noted that, although rotation axis xx' is vertical to FIG. 1, this is obviously non-limitative. Thus, the orientation of axis xx' is essentially determined by the orientation of the end of robot 10, which is itself dependent on the orientation of the surface of the part on which the task is to be performed. In practice, axis xx' must merely be relatively close to the normal to the surface.

Referring once again to FIG. 1, it can be seen that the lower end of shaft 22 is fixed to a guidance rod 25. Which is preferably orthogonal to axis xx', i.e. substantially horizontal in the case of FIG. 1. A plate 26 carrying tool 14 and the detection system 16 slides along rod 25 via translation guidance means 28, so as to define the second degree of freedom of tool holder 18. Thus, this second degree of freedom consists of a translation T in a direction yy' orthogonal to axis xx'. As illustrated in FIG. 1, the direction yy' of translation T is preferably oriented with the aid of robot 10 and/or the tool holder, in such a way that it is substantially orthgonal to that portion of line 12 located in front of the tool and the detection system.

FIG. 1 shows plate 26 in its reference position corresponding to the centre of the travel authorized by the translation guidance means 28. In this position, it can be seen that the rotation axis xx' passes through the active centre A of tool 14. When the tool is constituted by a welding torch in the manner shown, the active centre A is the end of the torch electrode.

As can be seen in FIG. 1, a motor $M\theta$ is associated with joint 24, in order to control the rotation about axis xx' of shaft 22 and all the parts supported by it, with respect to plate 20. In a comparable manner, motor MT is associated with the guidance means 28, in order to control the translation T of plate 26 and the working head 15 supported thereon, in one or other sense along direction yy'.

Figure 2:
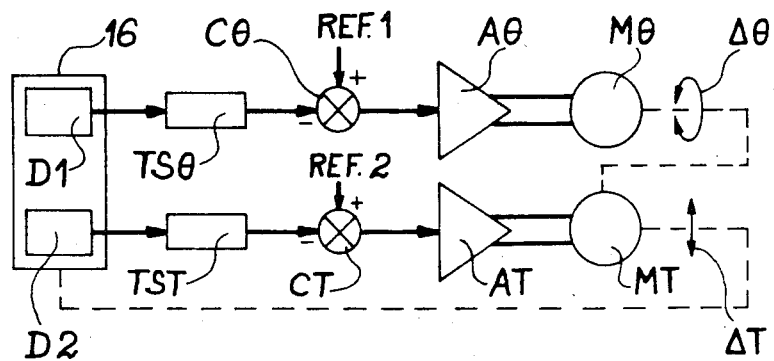
FIG. 2 diagrammatically the feedback or control circuits associated with the mechanism shown in FIG. 1.

FIG. 2 diagrammatically shows the feedback or control circuits for controlling motors $M\theta$ and MT on the basis of signals supplied by detection system 16. More specifically, FIG. 2 relates to a third embodiment of the invention, in which detection system 16 comprises two position detectors for controlling motors $M\theta$ and MT respectively, via two separate control circuits.

Thus, it can be seen in FIG. 2 that detector 16 comprises a first detector D1, positioned upstream with respect to the displacement of the working head 15 along its path and a second detector D2 located between detector D1 and tool 14. As will be shown hereinafter, the ends of detectors D1 and D2, as well as the active centre A of tool 14 are aligned and are as close together as possible.

The signals supplied by detector D1 are transmitted to an associated processing circuit $TS\theta$, which supplies a signal representing the instantaneous lateral displacement of detector D1 with respect to the line 12 about rotation axis xx'. This signal is compared in an adder $C\theta$ with a generally zero reference signal REF1, corresponding to the desired value for said angular position. An error signal is emitted by adder $C\theta$ if there is an angular displacement between the true position of detector D1 and the theoretical position. This signal is amplified in an amplifier $A\theta$, and is then transmitted to motor $M\theta$ in order to effect the desired correction $\Delta\theta$ of orientation $\theta$.

In the same way, the signal supplied by detector D2 is processed in an appropriate processing circuit TST before being compared with a zero reference signal in an adder CT. The existence of a displacement in direction yy' between the true position of detector D2 and its theoretical position on line 12 leads to the emission of an error signal by adder CT, which is used for controlling motor MT, after it has been amplified in amplifier AT. A correction of the path $\Delta T$ in the sense of translation T is consequently automatically performed.

The broken lines in FIG. 2 symbolize the mechanical connection between the detection system 16 and motors $M\theta$ and MT.

It should be noted that the processing circuits of $TS\theta$ and TST, respectively associated with detectors D1 and D2 vary as a function of the type of detector used, and are constituted by circuits which are well known for each detector type, so that they will not be described in detail here.

Figure 3:
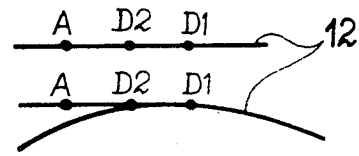
FIG. 3 the conditions of use of the tool holder shown in FIGS. 1 and 2, as a function of the curvature of the path to be followed.

The upper part of FIG. 3 shows that when line 12 is linear or substantially linear, the double control effected with the aid of the diagram of FIG. 2 makes it possible, during welding, to keep the two detectors D1, D2 facing the line to be followed and consequently the active centre A of the tool facing said line, because A, D1 and D2 are aligned in the manner shown hereinbefore.

However, the lower part of FIG. 3 shows that there is a limiting radius of curvature for path 12, as from which tool 14 no longer positioned with sufficient accuracy thereon. In practice, this limit is a function of the distance separating the active centre A and detectors D1, D2, and the accuracy required for the process in question.

For example, in a welding robot constructed according to the invention and in which the distance A-D2 is 1.5 cm and the distance A-D1 is 2.5 cm, it is possible to weld parts in accordance with welding lines having radii of curvature which can be up to 10 cm.

Hereinafter, an embodiment of the invention will be described in the case where the path to be followed is initially stored by a learning operation.

During a learning operation for storing the path to be followed by the end of robot 10 during the subsequent performance of its task, plate 26 supporting the working head 15 is maintained in its central reference position shown in FIG. 1. The rotor of motor Mθ is also kept in the reference position. Tool 14 and detection system 16 are permanently kept facing the line 12 by means of robot 10. This angular orientation of the tool holder can be carried out without using a high degree of precision, because it is intended to ensure that the detection system will be placed in its working zone during the performance of the task. Moreover, in certain applications it makes it possible to correctly orient a device associated with the tool, such as a filling metal supply system in the case of a welding robot.

During the performance of the task, the two detectors D1 and D2 supply signals which, after processing, represent the instantaneous angular variations θ and the instantaneous lateral variation T between the path followed by the working head 15 and the line to be followed. The control circuits described with reference to FIG. 2 act on motors Mθ and MT in order to carry out the corresponding path corrections.

During the performance of the task it is also possible to investigate the line to be followed at the start of the path by acting on θ (by robot 10 or the tool holder), in order to adjust the sensor on the joint.

Obviously the invention is not limited to the embodiment described hereinbefore and in fact covers all variants thereof. In particular, it is pointed out that it is possible to add to the tool holder 18 according to the invention, a third degree of freedom making it possible to effect an automatic heightwise positioning of tool 14. In practice, as illustrated by FIG. 1, this degree of freedom could be obtained by constructing shaft 22 or plate 26 in two parts, 22a, 22b, interconnected by translation guidance means, 30, like means 28, authorizing a relative displacement between said two parts in a direction T', parallel to or substantially parallel to the pivoting axis xx'. The translation movement permitted in this way would then be controlled by a third motor, MT', which would be controlled by means of a third detector and a third control circuit like those described hereinbefore with reference to FIG. 2.

Obviously, in place of using two position detectors D1 and D2, it would be possible to use a single position detector and an orientation detector. For example, the latter can be an optical sensor or transducer sensitive to the image of the line to be followed, which controls the rotation θ in such a way that the translation axis T is perpendicular to the tangent to the line at the detection point, whilst the position detector controls the translation T, so that the latter is set on the line. Finally, the detection system can be positioned downstream instead of upstream of the tool.

What is claimed is:

1. A device for positioning a tool incorporating a tool holder for fixing said tool to the end of a carrier able to move in accordance with a stored path for carrying out, on the basis of the detection of a true path to be followed by the tool, tool path corrections with respect to the stored path, said tool holder supporting a position detector displaced in the direction of the stored path relative to an active centre of the tool via means for displacing the detector in a direction permitting a setting thereof on the true path, a first feedback or control circuit being associated with the position detector and controlling said means for displacing the detector, wherein the device also comprises an orientation detector, the detectors being rigidly fixed to the tool in order to form a working head therewith, said means for displacing the detector being translation means for displacing the working head in a direction orthogonal to the plane passing through the ends of the detector and through the active centre of the tool, rotation means being provided for rotating the working head and the translation means about an axis contained in the plane and passing through the active centre of the tool, a second feedback or control circuit being associated with the orientation detector and controlling said rotation means.

2. A device according to claim 1, further comprising a second translation means for displacing the working head parallel to the said axis.

3. A device according to anyone of claims 1 and 2, wherein the orientation detector comprises a second position detector displaced in the direction of the stored path relative to said position detector.

4. A device according to claim 3, wherein the orientation detector is positioned upstream of the position detector, on considering the displacement direction of the working head along the true path.

5. A device for positioning a tool along a path, comprising:
  a carrier for moving said tool in accordance with a stored representation of said path;
  a tool holder fixed to the end of said carrier for holding and positioning said tool;
  position detection means supported by said tool holder and rigidly fixed to said tool to form a working head, said position detection means being positioned from said tool along said path;
  said position detection means including a first detector and a second detector for determining the position of said path;
  said tool holder including translation means for displacing said working head in a direction orthogonal to the plane passing through said first and second detectors in the centre of said tools, and rotation means for rotating said working head and said translation means about an axis contained in said plane and passing through the centre of said tool;

a first feedback circuit connected to said first detector and said translation means; and a second feedback circuit connected to said second detector and said rotation means;

said translation means and said rotation means being controlled by said first and second detectors through said first and second feedback circuits, respectively, to cause tool path corrections with respect to said stored representation of said path so that said tool follows said path.

6. A device according to claim 5, wherein said tool holder further includes a second translation means for displacing said working head parallel to said axis;

wherein said position detection means further includes a third detector; and said device further comprises a third feedback circuit connected to said second translation means and said third detector for controlling said second translation means according to said third detector.

* * * * *